US011988026B2

(12) United States Patent
Lee

(10) Patent No.: US 11,988,026 B2
(45) Date of Patent: May 21, 2024

(54) LOCK HAVING ROTATABLE AUXILIARY POSITIONING STRUCTURE

(71) Applicant: TAIWAN FU HSING INDUSTRIAL CO., LTD., Kaohsiung (TW)

(72) Inventor: Wen-Chieh Lee, Kaohsiung (TW)

(73) Assignee: Taiwan Fu Hsing Industrial Co., Ltd., Kaohsiung (TW)

( * ) Notice: Subject to any disclaimer, the term of this patent is extended or adjusted under 35 U.S.C. 154(b) by 291 days.

(21) Appl. No.: 17/647,199

(22) Filed: Jan. 6, 2022

(65) Prior Publication Data

US 2023/0127753 A1 Apr. 27, 2023

(30) Foreign Application Priority Data

Oct. 26, 2021 (TW) ................................ 110212616

(51) Int. Cl.
*E05B 63/00* (2006.01)
*E05B 9/08* (2006.01)
*E05B 9/10* (2006.01)

(52) U.S. Cl.
CPC .................. *E05B 9/08* (2013.01); *E05B 9/10* (2013.01); *E05B 63/0017* (2013.01)

(58) Field of Classification Search
CPC ... E05B 9/08; E05B 9/10; E05B 15/02; E05B 55/005; E05B 63/14; E05B 63/0065; E05B 63/0017; E05C 7/02
See application file for complete search history.

(56) References Cited

U.S. PATENT DOCUMENTS 11,306,510 B2 * 4/2022 Cheng .................... E05B 9/002
11,408,197 B2 * 8/2022 Chen ......................... E05B 9/02

* cited by examiner

*Primary Examiner* — Michael P Ferguson
*Assistant Examiner* — Thomas L Neubauer
(74) *Attorney, Agent, or Firm* — Rosenberg, Klein & Lee

(57) ABSTRACT

A lock having a rotatable auxiliary positioning structure is adapted to connect with a latch element which includes a drive orifice, and the lock contains: a first locking assembly and a second locking assembly. The first locking assembly includes a transmission unit and a guide seat, the guide seat has at least one guiding extension. The second locking assembly includes a driving element, and a connecting position is defined between the first locking assembly and the second locking assembly in a rotatable direction. At least one of the transmission unit and the driving element is rotatably received in and drives the drive orifice of the latch element, the at least one guiding extension is configured to be connected with the latch element and to guide the first locking assembly to be positioned on the connecting position along the rotatable direction opposite to the latch element.

20 Claims, 12 Drawing Sheets

LOCK HAVING ROTATABLE AUXILIARY POSITIONING STRUCTURE

FIELD OF THE INVENTION

The present invention relates to a lock having a rotatable auxiliary positioning structure which contains the guide seat and the at least one guiding extension to facilitate the alignment of the first locking assembly with the second locking assembly easily in the rotatable direction, when connecting the lock.

BACKGROUND OF THE INVENTION

Conventionally, doors are fixed in a building so that users walk into and out of the building, wherein the doors are made of various materials in different sizes and thicknesses, and a conventional lock is mounted on the doors to lock and unlock the doors.

The conventional lock contains two locking assemblies fixed on two sides of the door and locked and unlocked by a key, wherein the locking assembly is a locking knob or a locking core. When connecting the lock, a lock bolt is mounted behind a receiving orifice of the door, and the two locking assemblies are connected by using at least one screw. However, the two locking assemblies are shielded by the door and are not limited when being moved in a rotatable direction, thus trying to connect the two locking assemblies repeatedly. Then, the at least one screw is screwed with one locking assembly via the other locking assembly, thus having troublesome and time-consuming connection. Also, when trying to connect the two locking assemblies repeatedly, the two locking assemblies are damaged by the at least one screw easily.

The present invention has arisen to mitigate and/or obviate the afore-described disadvantages.

SUMMARY OF THE INVENTION

The primary objective of the present invention is to provide a lock having a rotatable auxiliary positioning structure which is capable of overcoming the shortcomings of the conventional lock.

To obtain above-mentioned objective, a lock having a rotatable auxiliary positioning structure provided by the present invention is adapted to connect with a latch element which includes a drive orifice, and the lock contains: a first locking assembly and a second locking assembly.

The first locking assembly includes a transmission unit and a guide seat connected on an end of the transmission unit. The guide seat has at least one guiding extension which extends from the guide seat.

The second locking assembly includes a driving element connected with the transmission unit, a connecting position being defined when the first locking assembly and the second locking assembly are connected in a rotatable direction, and the transmission unit and the driving element are rotated in an axial direction.

At least one of the transmission unit and the driving element is rotatably received in and drives the drive orifice of the latch element. The at least one guiding extension is configured to be connected with the latch element and to guide the first locking assembly to be positioned on the connecting position along the rotatable direction opposite to the latch element.

Preferably, a respective one of the at least one guiding extension has a contact face formed on an end of the respective one guiding extension and corresponding to a profile of the latch element, and the respective one guiding extension contacts with the latch element by using the contact face so that the transmission unit is located on the connecting position.

Preferably, the first locking assembly includes a first body configured to drive the transmission unit, and the first body has at least one connection portion formed on an end thereof facing the latch element. The guide seat includes an abutting portion corresponding to the first body and having a coupling portion corresponding to the at least one connection portion, hence the guide seat is connected with the at least one connection portion by using the coupling portion so that the guide seat is connected with the first body.

Preferably, the first body has a first core element, and the abutting portion has an accommodation orifice corresponding to the first core element.

Preferably, the first body includes at least one locking orifice, and the guide seat has at least one positioning orifice defined on the abutting portion and corresponding to the at least one locking orifice. The second locking assembly includes at least one third connecting orifice corresponding to the at least one locking orifice and the at least one positioning orifice, and a defining element is configured to connect with the at least one locking orifice via the at least one third connecting orifice and the at least one positioning orifice when the first locking assembly and the second locking assembly are located on the connecting position.

Preferably, the guide seat further includes a leading element, and the second locking assembly includes a fixer. The fixer has a conducting portion corresponding to the leading element so that the conducting portion is connected with the leading element, when the first locking assembly and the second locking assembly are located on the connecting position.

Preferably, when the leading element is a slide rail, the conducting portion is a slider. When the leading element is a slider, the conducting portion is a slide rail.

Preferably, when the guide seat includes the two guiding extensions, the two guiding extensions are located beside two sides of the leading element.

Preferably, the second locking assembly further includes a locating lid, and the locating lid has at least one joining portion. The driving element is inserted through the locating lid, and the fixer further has at least one securing element corresponding to and connected with the at least one joining portion so that the fixer is connected with the locating lid.

Preferably, the second locking assembly further includes a knob, an end of which the driving element is mounted, and the driving element is inserted through the locating lid to connect with the transmission unit.

Preferably, the fixer further has a fitting portion corresponding to the driving element, the fitting portion has at least one mounting projection facing the knob, and the fitting portion has an affix ring received in the at least one mounting projection and connected with the driving element.

Preferably, the second body includes at least one recessed portion, at least one disposing face formed on an end of the at least one recessed portion, and the fixer has at least one engagement arm configured to abut against the at least one disposing face.

Preferably, the second body includes three recessed portions formed on two sides of a top of the second body and a bottom of the second body, and the at least one engagement arm is columnar.

Preferably, the second body has a second core element, a distal end of which is connected with the driving element, and the fixer further has a passing aperture defined thereon and fitting with the second core element.

Preferably, the transmission unit is intersected with the driving element, and the transmission unit is perpendicular to and is connected with the driving element on the connecting position.

In another embodiment, a lock having a rotatable auxiliary positioning structure is adapted to connect with a latch element which includes a drive orifice, and the lock contains: a first locking assembly and a second locking assembly.

The first locking assembly includes a transmission unit and a guide seat connected on an end of the transmission unit, and the guide seat has at least one guiding extension which extends from the guide seat.

The second locking assembly includes a driving element connected with the transmission unit, a connecting position is defined between the first locking assembly and the second locking assembly in a rotatable direction so that when the first locking assembly and the second locking assembly are connected on the connecting position, the first locking assembly is rotated along the transmission unit and the second locking assembly is rotated along the driving element.

At least one of the transmission unit and the driving element is rotatably received in and drives the drive orifice of the latch element. The at least one guiding extension is configured to be connected with the latch element and to guide the first locking assembly to be positioned along the rotatable direction opposite to the latch element so that the transmission unit is located on the connecting position.

The guide seat further includes a leading element, the second locking assembly includes a fixer, the fixer has a conducting portion corresponding to the leading element, and the leading element and the conducting portion are connected when locating on the connecting position.

The first locking assembly includes a first body, the first body has at least one locking orifice, and the guide seat has at least one positioning orifice defined on the abutting portion and corresponding to the at least one locking orifice, the second locking assembly includes at least one third connecting orifice corresponding to the at least one locking orifice and the at least one positioning orifice. A defining element is configured to connect with the at least one locking orifice via the at least one third connecting orifice, the at least one positioning orifice, and a through hole of the fixer when locating on the connecting position.

Preferably, the second locking assembly further includes a locating lid, and the locating lid has the at least one third connecting orifice and at least one joining portion. The driving element is inserted through the locating lid. The fixer further has at least one securing element corresponding to and connected with the at least one joining portion so that the fixer is connected with the locating lid.

In another embodiment, a lock having a rotatable auxiliary positioning structure is connected with a latch element which includes a drive orifice, and the lock contains: a first locking assembly and a second locking assembly.

The first locking assembly includes a transmission unit and a guide seat connected on an end of the transmission unit. The guide seat has at least one guiding extension which extends from the guide seat.

The second locking assembly includes a driving element connected with the transmission unit, and a connecting position is defined between the first locking assembly and the second locking assembly in a rotatable direction so that when the first locking assembly and the second locking assembly are connected on the connecting position, the first locking assembly is rotated along the transmission unit and the second locking assembly is rotated along the driving element.

At least one of the transmission unit and the driving element is rotatably received in and drives the drive orifice of the latch element. The at least one guiding extension is configured to be connected with the latch element and to guide the first locking assembly to be positioned along the rotatable direction opposite to the latch element so that the transmission unit is located on the connecting position.

The guide seat further includes a leading element, the second locking assembly includes a fixer, the fixer has a conducting portion corresponding to the leading element, and the leading element and the conducting portion are connected when locating on the connecting position.

The first locking assembly includes a first body, and the second locking assembly includes a second body. The second body has at least one recessed portion, at least one disposing face formed on an end of the at least one recessed portion, and the fixer has at least one engagement arm configured to abut against the at least one disposing face.

The first body has at least one locking orifice, and the guide seat has at least one positioning orifice defined on the abutting portion and corresponding to the at least one locking orifice. The second locking assembly includes at least one third connecting orifice corresponding to the at least one locking orifice and the at least one positioning orifice. A defining element is configured to connect with the at least one locking orifice via the at least one third connecting orifice, and the at least one positioning orifice when locating on the connecting position.

Thereby, the lock of the present invention has advantages as follows:

1) When connecting the lock, the at least one guiding extension of the guide seat is connected with the latch element so that the first locking assembly and the second locking assembly beside two sides of the door are moved to the connecting position so as to be aligned with each other in the rotatable direction. Then, the defining element is configured to connect the first locking assembly with the second locking assembly easily and exactly.
2) The guide seat includes the leading element, and the second locking assembly includes the fixer, such that the conducting portion of the fixer is connected with the leading element, and the first locking assembly is aligned and connected with the second locking assembly in advance to avoid holding the first locking assembly and the second locking assembly manually. Thereafter, the defining element is configured to connect the first locking assembly with the second locking assembly quickly and easily.

DETAILED DESCRIPTION OF THE PREFERRED EMBODIMENTS

Figure 1:
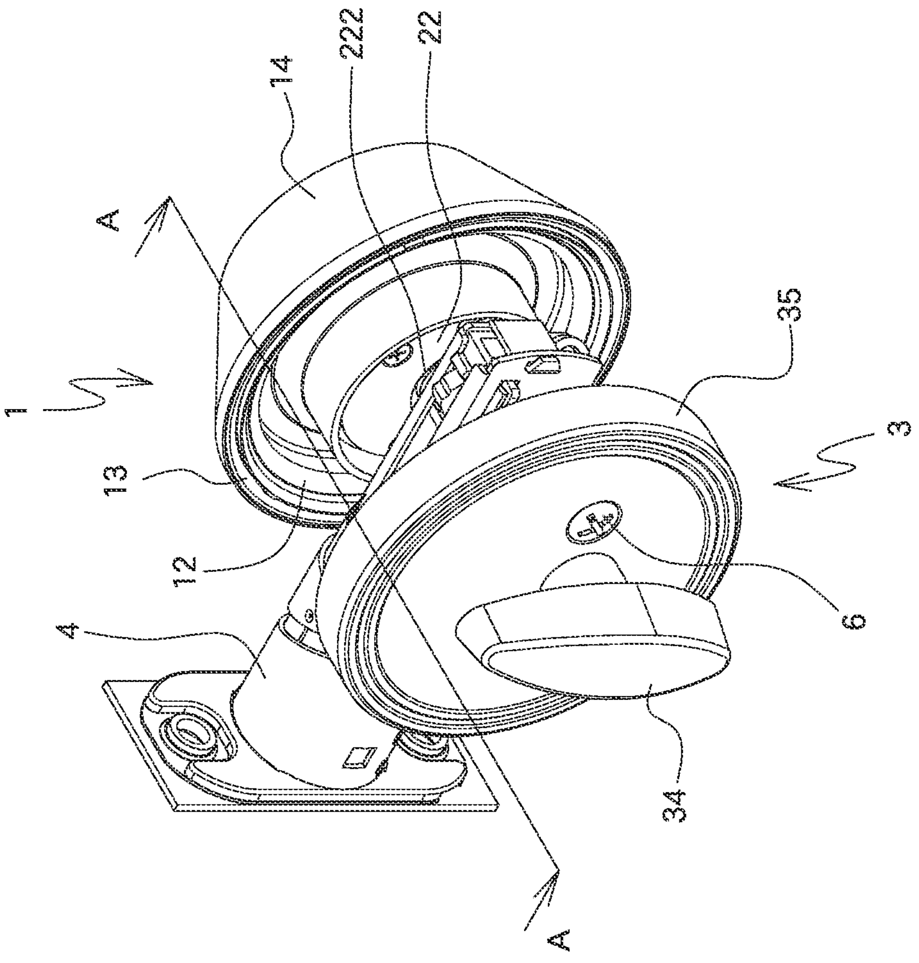
FIG. 1 is a perspective view showing the assembly of a lock having a rotatable auxiliary positioning structure according to a first embodiment of the present invention.

With reference to FIGS. 1-7, a lock having a rotatable auxiliary positioning structure according to a first embodiment of the present invention is adapted to connect with a latch element 4 which includes a drive orifice 41, and the lock comprises:

- a first locking assembly 1 including a transmission unit 11 and a guide seat 2 connected on an end of the transmission unit 11, the guide seat 2 having at least one guiding extension 21 which extends from the guide seat 2; and
- a second locking assembly 3 including a driving element 31 connected with the transmission unit 11, a connecting position being defined between the first locking assembly 1 and the second locking assembly 3 in a rotatable direction so that when the transmission unit 11 and the driving element 31 are located on the connecting position, the transmission unit 11 is connected with the driving element 31 in an axial direction, wherein the rotatable direction represents the first locking assembly 1 is axially rotated along the transmission unit 11 and the second locking assembly 3 is axially rotated along the driving element 31, and the axial direction denotes that the first locking assembly 1 is horizontally moved along the transmission unit 11 and the second locking assembly 3 is horizontally moved along the driving element 31. However, it is only an illustrative description in the rotatable and axial directions, not as a limitation to the rotatable and the axial directions.

At least one of the transmission unit 11 and the driving element 31 is rotatably received in and drives the drive orifice 41 of the latch element 4, wherein the latch element 4 is configured to lock and unlock a lock bolt, and the at least one of the transmission unit 11 and the driving element 31 is rotatably received in the drive orifice 41 to lock and unlock the lock bolt. Since the latch element 4 is a well-known prior art, further remarks are omitted. In one embodiment, the transmission unit 11 is a non-cylindrical rod, and the driving element 31 has a receiving orifice configured to receive and drive the transmission unit 11.

Figure 5:
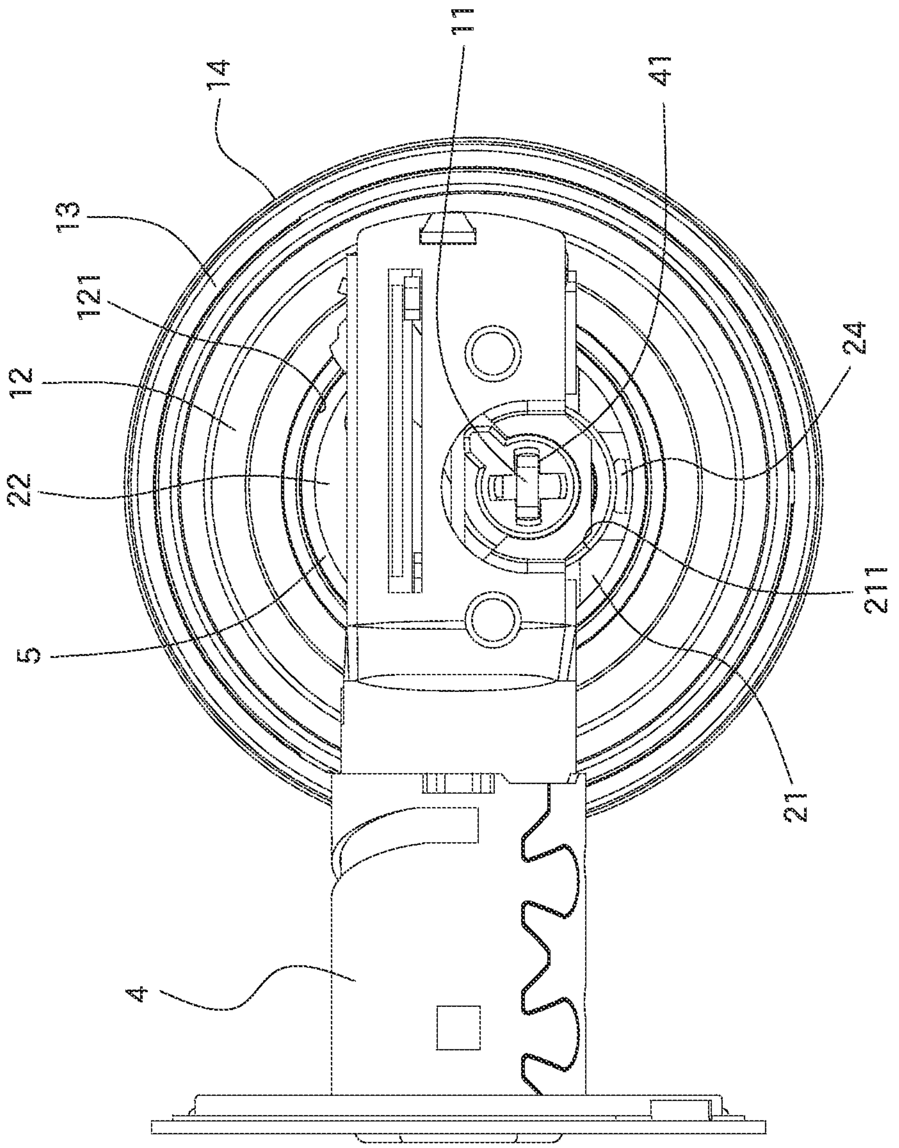
FIG. 5 is a side plan view showing the operation of the lock having the rotatable auxiliary positioning structure according to the first embodiment of the present invention.
Figure 6:
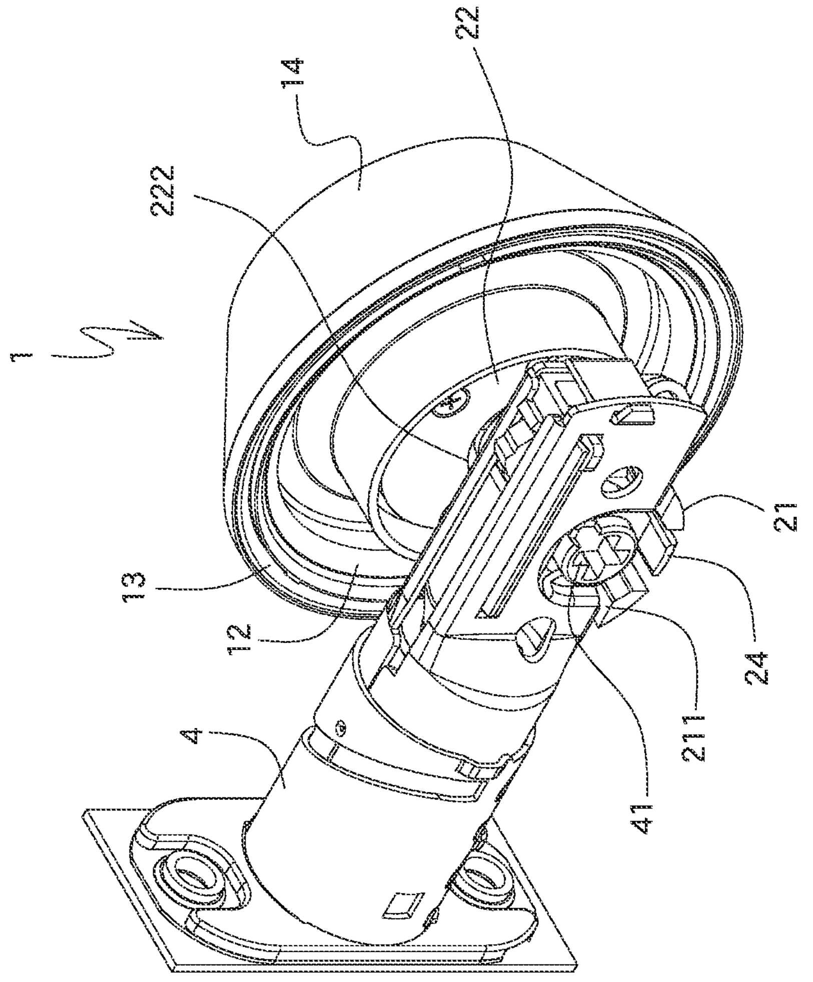
FIG. 6 is a perspective view showing the operation of the lock having the rotatable auxiliary positioning structure according to the first embodiment of the present invention.
Figure 7:
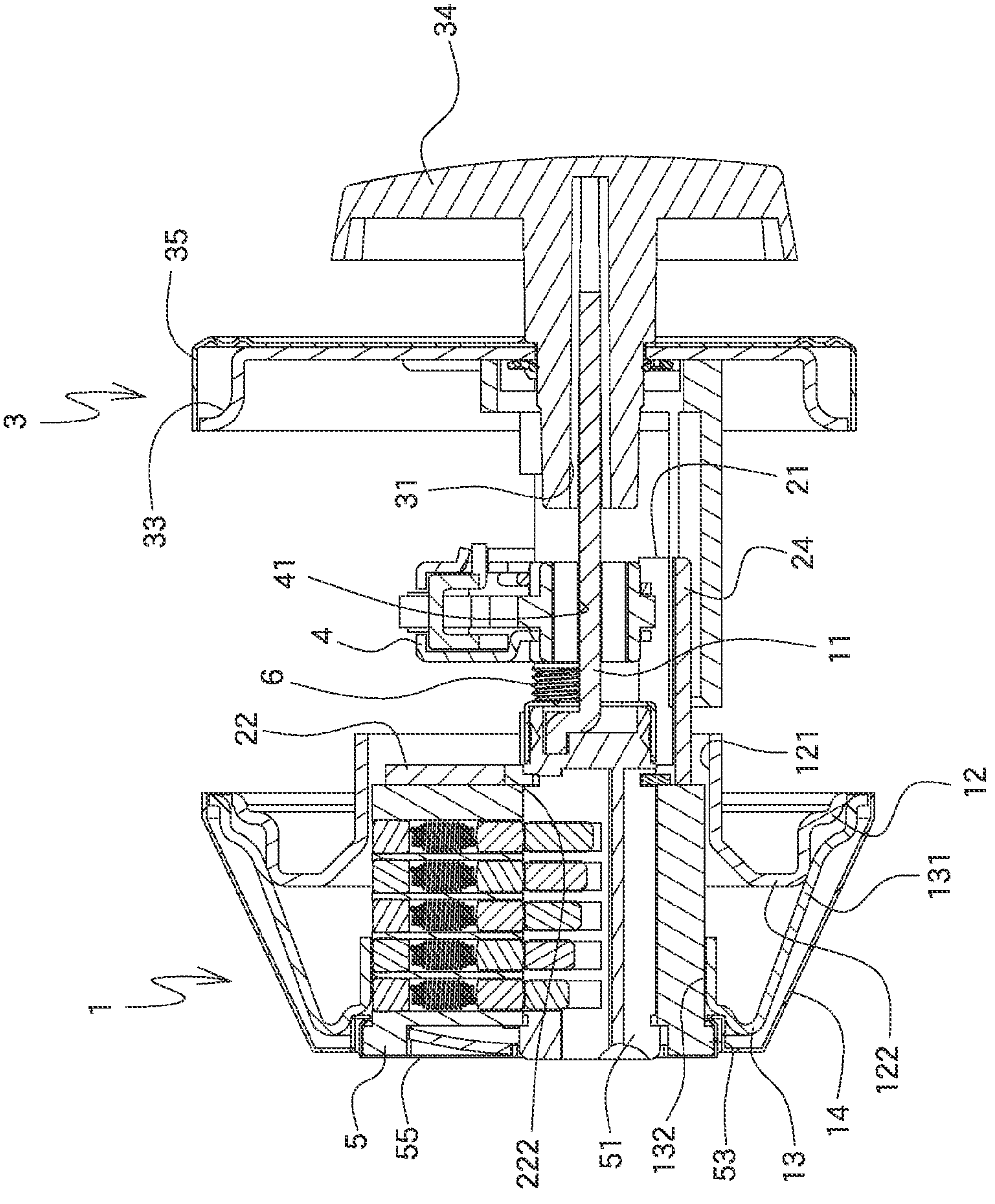
FIG. 7 is a cross sectional view taken along the line A-A of FIG. 1.
Figure 8:
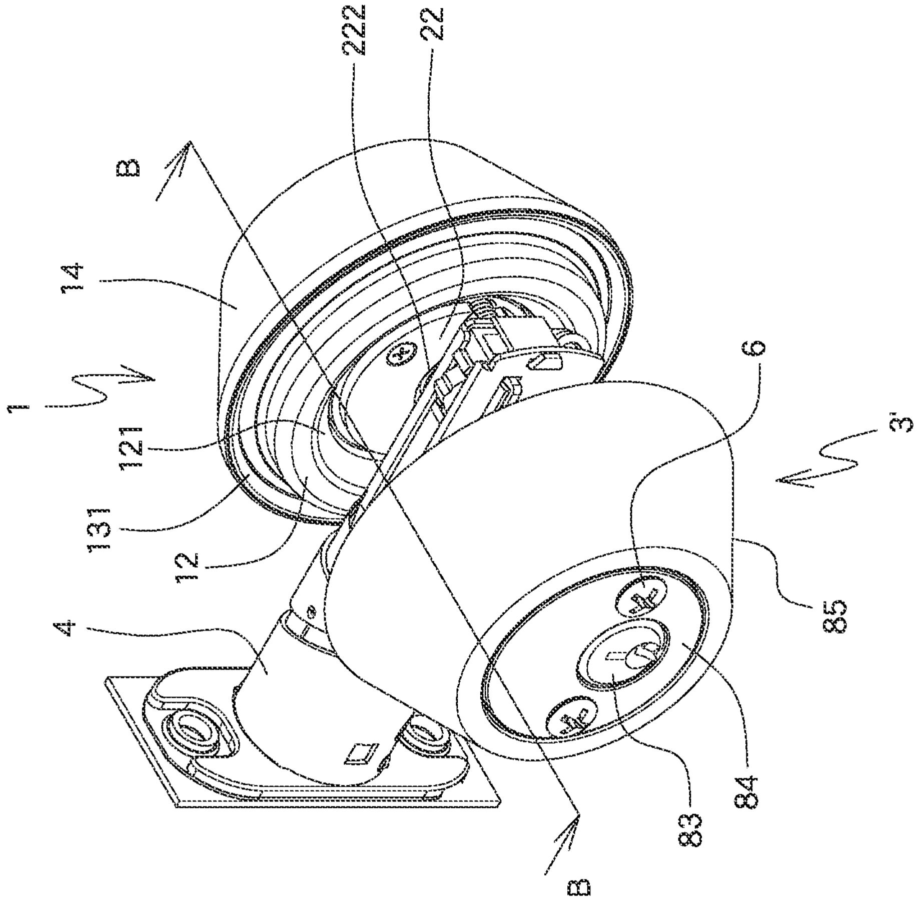
FIG. 8 is a perspective view showing the assembly of a lock having a rotatable auxiliary positioning structure according to a second embodiment of the present invention.

The at least one guiding extension 21 is configured to be connected with the latch element 4 and to guide the transmission unit 11 to locate on the connecting position. In this embodiment, the at least one guiding extension 21 is connected or contacts with the latch element 4 upward. As shown in FIGS. 5 and 6, the at least one guiding extension 21 contacts with a bottom of the latch element 4 so that the first locking assembly 1 and the transmission unit 11 are rotated to the connecting position, wherein a respective one of the at least one guiding extension 21 has a contact face 211 formed on an end of the respective one guiding extension 21 and corresponding to a profile of the latch element 4, and the contact face 211 is a plane or is curved so that the respective one guiding extension 21 contacts with the latch element 4. Preferably, the guide seat 2 includes two guiding extensions 21 which contact with the latch element 4, such that when the respective one contact face 211 contacts with the latch element 4 and is located on the connecting position, the guide seat 2 is fixed securely and does not rotate to remove from the connecting position.

Figure 2:
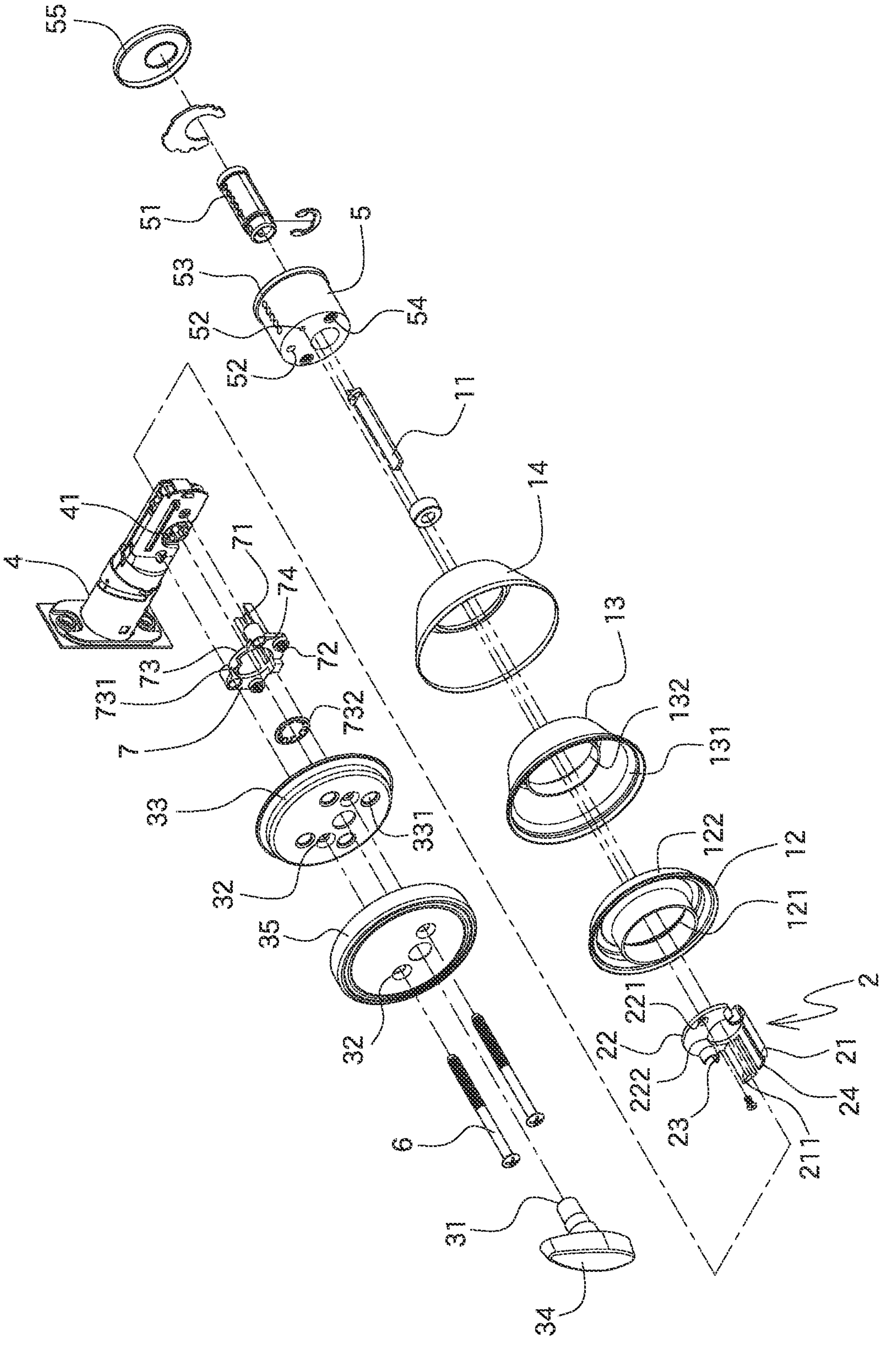
FIG. 2 is a perspective view showing the exploded components of the lock having the rotatable auxiliary positioning structure according to the first embodiment of the present invention.
Figure 3:
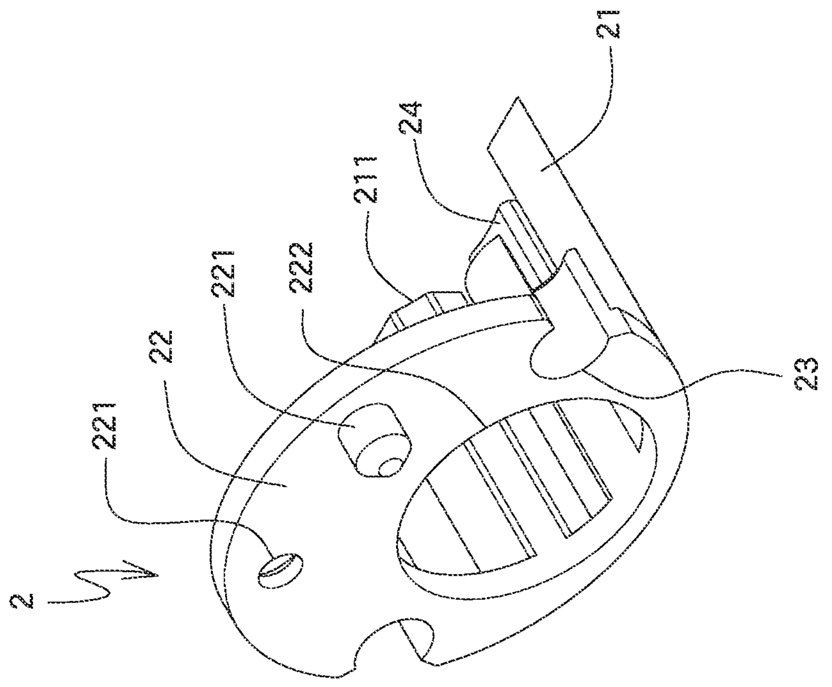
FIG. 3 is a perspective view showing the assembly of a guide seat of the lock having the rotatable auxiliary positioning structure according to the first embodiment of the present invention.

The first locking assembly 1 and the second locking assembly 3 are a knob or a lock bore which is arranged outside or in a door (not shown). In this embodiment, the first locking assembly 1 includes a first body 5 having a first core element 51 and is configured to drive the transmission unit 11 and to connect with the guide seat 2, wherein the first body 5 further has at least one connection portion 52 formed on an end thereof facing the latch element 4, and the guide seat 2 includes an abutting portion 22 corresponding to the first body 5 and having a coupling portion 221 corresponding to the at least one connection portion 52, hence the guide seat 2 is connected with the at least one connection portion 52 by using the coupling portion 221 so as to connect with the first body 5. Referring to FIGS. 2 and 3, the at least one connection portion 52 is a recess or a protrusion to correspond to the coupling portion 221 which is a protrusion or a recess. Alternatively, the at least one connection portion 52 is a first fixing orifice to correspond to the coupling portion 221 which is a second fixing orifice, such that the first fixing orifice 52 is connected with the second fixing orifice 221 by using a screw element. To avoid the abutting portion 22 interfering with the first core element 51 and the transmission unit 11, the abutting portion 22 has an accommodation orifice 222 configured to receive the first core element 51 and the transmission unit 11, and the accommodation orifice 222 corresponds to a profile of the first core element 51 so as to be connected with the first core element 51.

As illustrated in FIGS. 2 and 3, the first locking assembly 1 further includes a contacting cap 12 which has a first connecting orifice 121 for fitting with the first body 5, wherein the contacting cap 12 has a fringe 122 extending from an end thereof, and a reinforcement cap 13 has a shoulder 131 extending from a first end thereof and corresponding to the fringe 122 of the contacting cap 12, the reinforcement cap 13 further has a second connecting orifice 132 defined on a center thereof and corresponding to the first body 5, and a coupling cap 14 is covered on a second end of the reinforcement cap 13 opposite to the contacting cap 12, such that the reinforcement cap 13, the contacting cap 12, and the first body 5 are connected, and a lock hole of the first core element 51 exposes outside and accommodates a key. The first body 5 has a protruded portion 53 to abut against the coupling cap 14 when the first body 5 is connected with the coupling cap 14, and the first body 5 includes a protective sheet 55 fixed thereon to protect the first body 5. An end of the first core element 51 facing the latch element 4 is connected with the transmission unit 11 so that the first core element 51 actuates the latch element 4 after being driven to rotate.

The first body 5 further has at least one locking orifice 54, and the guide seat 2 has at least one positioning orifice 23 defined on the abutting portion 22 corresponding to the at least one locking orifice 54. The second locking assembly 3 includes at least one third connecting orifice 32 corresponding to the at least one locking orifice 54 and the at least one positioning orifice 23. A defining element 6 is configured to connect with the at least one locking orifice 54 via the at least one third connecting orifice 32 and the at least one positioning orifice 23 when the first locking assembly 1 and the second locking assembly 3 are located on the connecting position, wherein the at least one locking orifice 54 is a threaded orifice, and the defining element 6 is a screw. With reference to FIG. 5, when the first locking assembly 1 is located on the connecting position after the two guiding extensions 21 contact with the latch element 4, the guide seat 2 is aligned with the second locking assembly 1 easily so that the second locking assembly 3 is adjusted toward the connecting position, in the meantime, the at least one locking orifice 54, the at least one third connecting orifice 32 and the at least one positioning orifice 23 are aligned with one another so as to accommodate and lock with the defining element 6.

Figure 4:
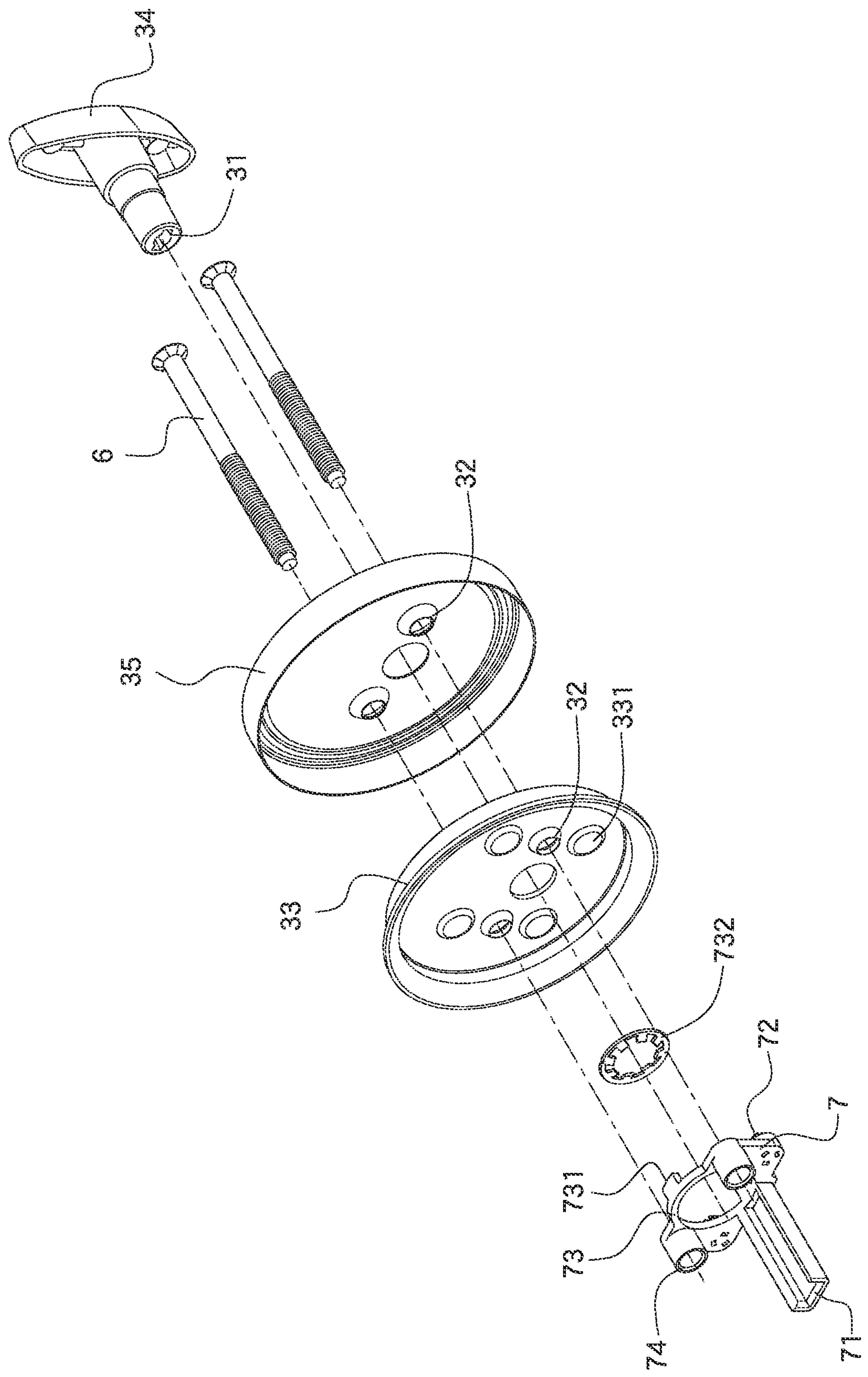
FIG. 4 is a perspective view showing the exploded components of a second locking assembly and a fixer of the lock having the rotatable auxiliary positioning structure according to the first embodiment of the present invention.

Thereby, the lock is connected by using the guide seat 2 easily. For example, the first locking assembly 1 and the second locking assembly 3 are connected, and the defining element 6 is screwed with the first body 5 and the second locking assembly 3 without holding the first locking assembly 1 or the second locking assembly 3. Thus, the guide seat 2 further includes a leading element 24, and the second locking assembly 3 includes a fixer 7, wherein the fixer 7 has a conducting portion 71 corresponding to the leading element 24 so that the conducting portion 71 is connected with the leading element 24 when the first locking assembly 1 and the second locking assembly 3 are located on the connecting position, such that when the first locking assembly 1 is connected with the latch element 4 as shown in FIG. 4, the conducting portion 71 of the fixer 7 of the second locking assembly is coupled with the leading element 24 directly, and the second locking assembly 3 is adjusted toward the connecting position so that the defining element 6 connects the first locking assembly 1 with the second locking assembly 3 easily. In one embodiment, when the leading element 24 is a slide rail, the conducting portion 71 is a slider. Alternatively, when the leading element 24 is a slider, the conducting portion 71 is a slide rail. When the guide seat 2 includes the two guiding extensions 21, the two guiding extensions 21 are located beside two sides of the leading element 24 so that when the two guiding extensions 21 are connected with the latch element 4, the leading element 24 is coupled with the conducting portion 71 easily.

Referring to FIGS. 2 and 4, the second locking assembly 3 further includes a locating lid 33, and the locating lid 33 has at least one joining portion 331. The driving element 31 is inserted through the locating lid 33. The fixer 7 further has at least one securing element 72 corresponding to and connected with the at least one joining portion 331 so that the fixer 7 is connected with the locating lid 33. In this embodiment, the at least one joining portion 331 is a joining orifice, and the at least one securing element 72 is a bolt, a tenon or a nail so as to connect with the at least one joining portion 331. The second locking assembly 3 is not a lock core, for example, the second locking assembly 3 further includes a knob 34, an end of which the driving element 31 is mounted, and the driving element 31 is inserted through the locating lid 33 to connect with the transmission unit 11, such that when the knob 34 is rotated, the driving element 31 is driven by the knob 34 to actuate the transmission unit 11, and the transmission unit 11 unlocks the lock. The second locking assembly 3 further includes a protection lid 35 connected on an end thereof opposite to the latch element 4 to cover the locating lid 33 and to decorate and protect the locating lid 33 and the fixer 7. In addition, the at least one third connecting orifice 32 is defined on the protection lid 35 and the locating lid 33.

The fixer 7 further has a fitting portion 73 corresponding to the driving element 31, wherein the fitting portion 73 has at least one mounting projection 731 facing the knob 34, and the fitting portion 73 has an affix ring 732 received in the at least one mounting projection 731 and connected with the driving element 31, thus fixing the driving element 31 firmly.

To connect the first locking assembly 1, the second locking assembly 3 and the fixer 7, the fixer 7 further has a through hole 74 corresponding to the at least one locking orifice 54, the at least one positioning orifice 23, and the at least one third connecting orifice 32, such that when the first locking assembly 1 and the second locking assembly 3 are connected by the defining element 6 on the connecting position, the defining element 6 is inserted through the through hole 74 to connect the first locking assembly 1, the second locking assembly 3, the fixer 7, and the guide seat 2 securely.

Figure 9:
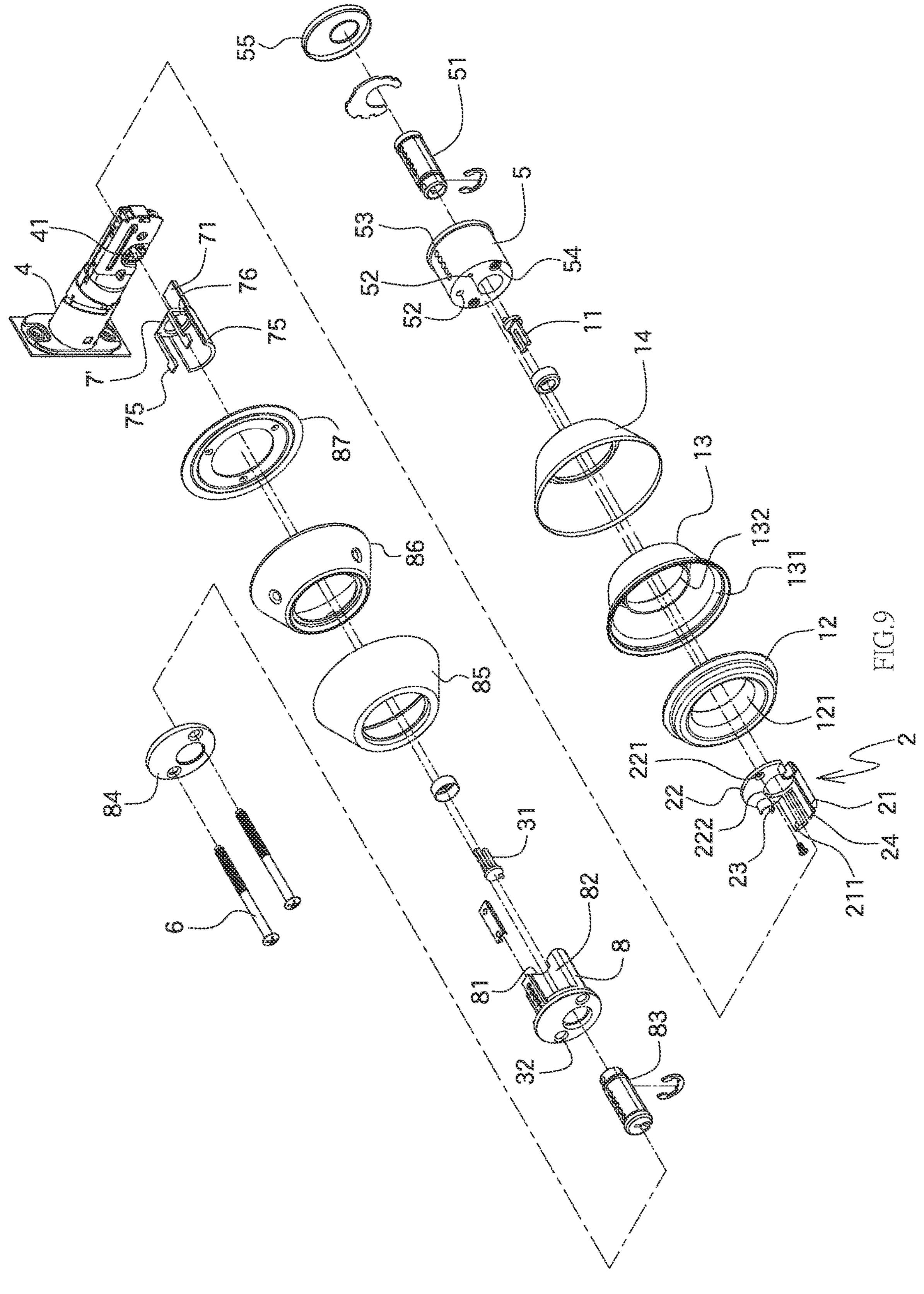
FIG. 9 is a perspective view showing the exploded components of the lock having the rotatable auxiliary positioning structure according to the second embodiment of the present invention.
Figure 10:
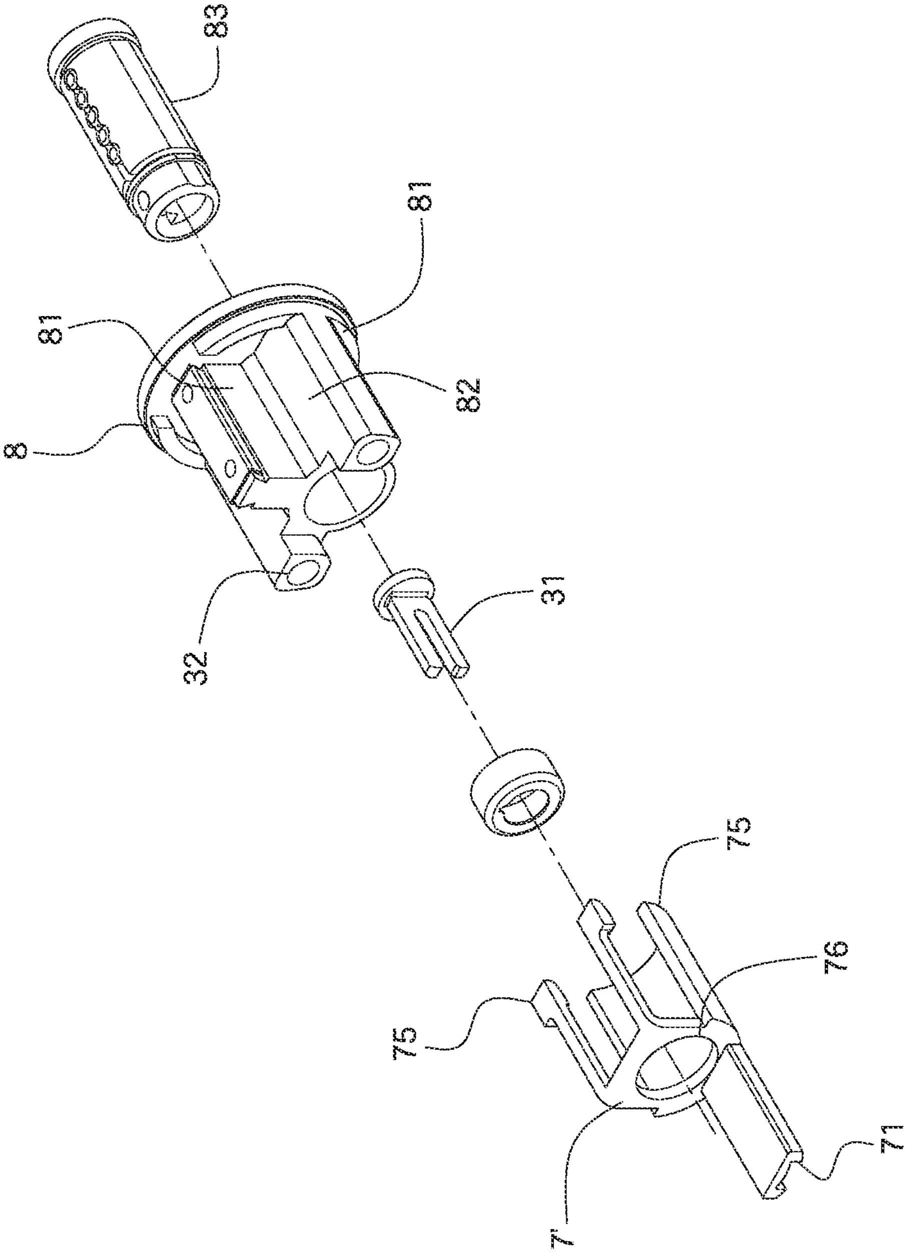
FIG. 10 is a perspective view showing the exploded components of a second locking assembly and a fixer of the lock having the rotatable auxiliary positioning structure according to the second embodiment of the present invention.
Figure 11:
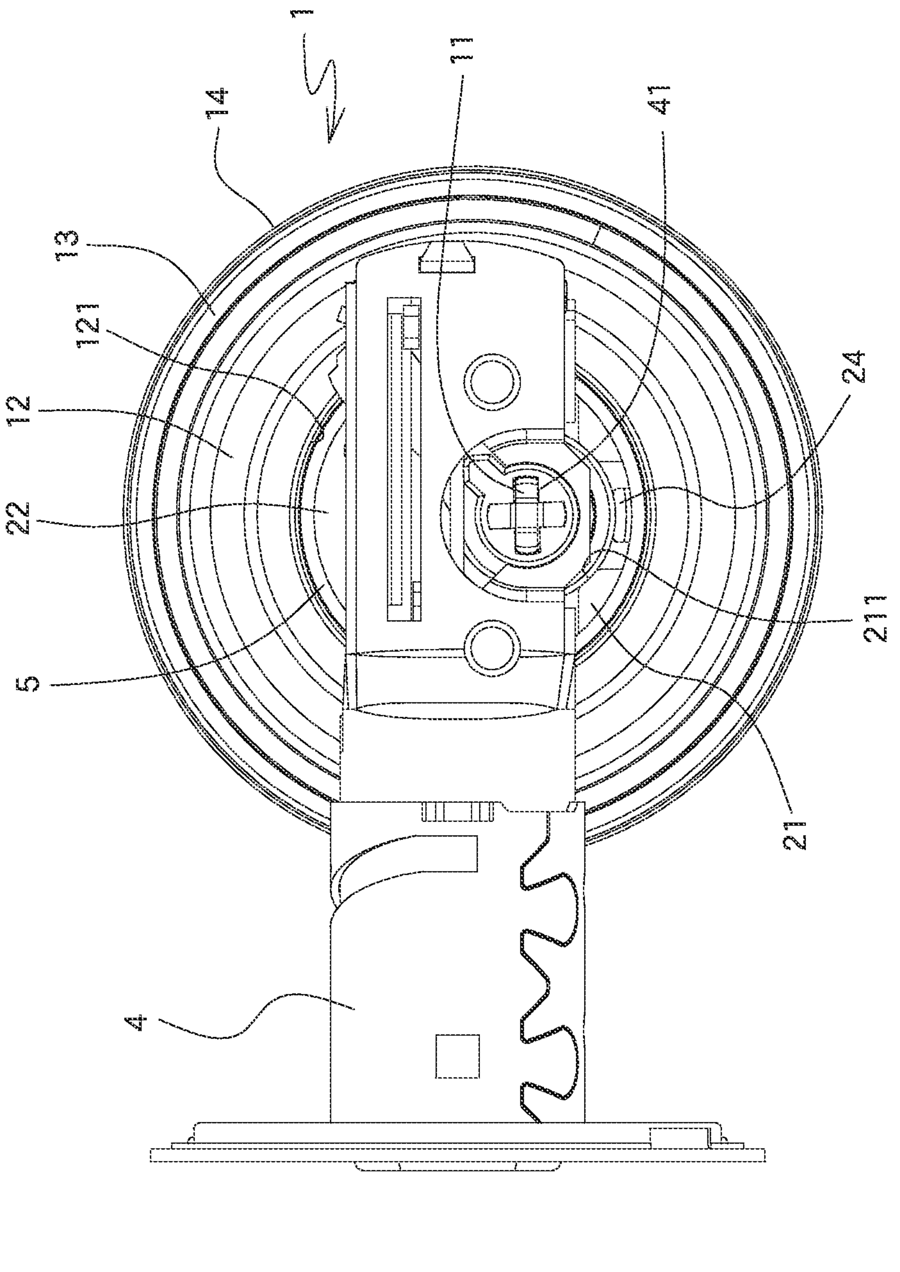
FIG. 11 is a side plan view showing the operation of the lock having the rotatable auxiliary positioning structure according to the second embodiment of the present invention.
Figure 12:
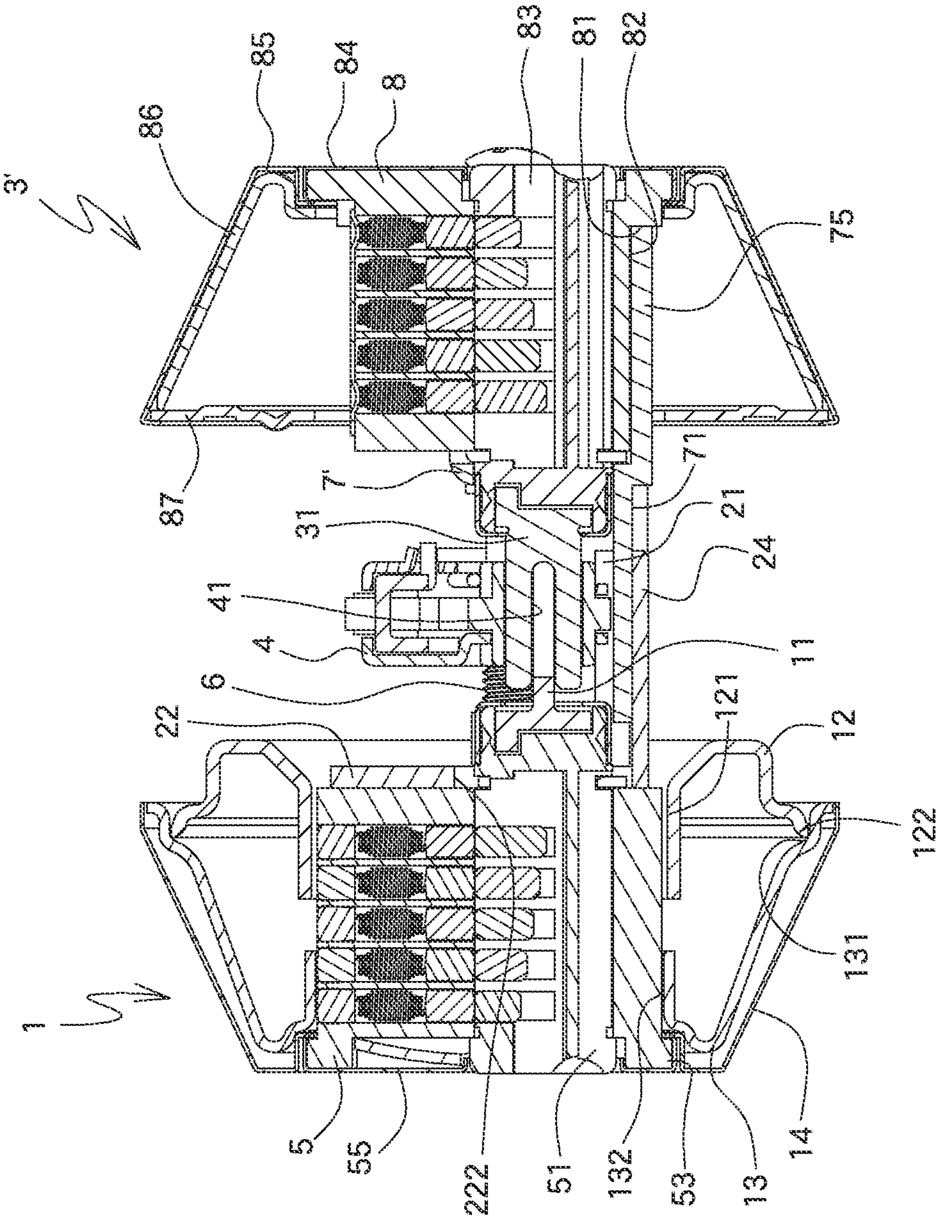
FIG. 12 is a cross sectional view taken along the line B-B of FIG. 8.

With reference to FIGS. 8-12, a difference of a lock of a second embodiment from that of the first embodiment comprises: a second locking assembly 3', as shown in FIGS. 9 and 10, wherein the second locking assembly 3' includes a second body 8 (instead of the knob 34 of the first embodiment), and the second body 8 has at least one recessed portion 81 for connecting with a fixer 7', at least one disposing face 82 formed on an end of the at least one recessed portion 81, and the fixer 7' has at least one engagement arm 75 configured to abut against the at least one disposing face 82, such that the fixer 7' is fixed on the second body 8 by using the at least one engagement arm 75. In this embodiment, the second body 8 further has three recessed portions 81 formed on two sides of a top of the second body 8 and a bottom of the second body 8, wherein the at least one engagement arm 75 is columnar, and the recessed portion 81 of the bottom of the second body 8 is arcuate to correspond to one of the at least one engagement arm 75 on the bottom of the fixer 7', the bottom of the second body 8 is an arcuate column, and the fixer 7' is engaged with the second body 8 by way of the other two engagement arms 75 on a top of the fixer 7' and the one engagement arm 75 on the bottom of the fixer 7'. Furthermore, a conducting portion 71 is a slide rail extending from the one engagement arm 75 of the bottom of the fixer 7' to contact with the leading element 24 so that the first locking assembly 1 is connected with the second locking assembly 3' by using the conducting portion 71 and the leading element 24.

The second body 8 has a second core element 83, a distal end of which is connected with the driving element 31, and the fixer 7' further has a passing aperture 76 defined thereon and fitting with the second core element 83, such that when the fixer 7' is connected with the second body 8, the fixer 7' does not interfere with the second core element 83 and the driving element 31. An end of the second body 8 opposite to the latch element 4 is connected with a decoration shell 84 for protecting and decorating the second body 8. The second body 8 further has a casing 85 in which a support portion 86 is mounted, and the support portion 86 has a bottom cover 87 facing the latch element 4, wherein the bottom cover 87, the support portion 86, and the casing 85 have an opening configured to correspond to and connect with the second body 8. Alternatively, the second body 8 is connected with the bottom cover 87, the support portion 86, and the casing 85 the same as the first body 5 of the first embodiment, so further remarks are omitted.

In this embodiment, the transmission unit 11 is intersected with the driving element 31, and the transmission unit 11 is perpendicular to and is connected with the driving element 31 on the connecting position.

To connect the first locking assembly 1 with the second locking assembly 3', the second body 8 has the at least one third connecting orifice 32 corresponding to the at least one locking orifice 54 and the at least one positioning orifice 23 so that when the first locking assembly 1 and the second locking assembly 3 are located on the connecting position, the first locking assembly 1, the second locking assembly 3, and the guide seat 2 are connected by the defining element 6 securely.

Thereby, the first locking assembly 1 is rotated toward the connecting position arcuately by using the guide seat 2 so as to align and connect with the second locking assembly 3. Likewise, the second locking assemblies 3, 3' include the fixers 7, 7' so that the leading element 24 is connected with the conducting portion 71, and the second locking assemblies 3, 3' are connected with the first locking assembly 1 on the connecting position exactly and easily.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A lock having a rotatable auxiliary positioning structure being adapted to connect with a latch element which includes a drive orifice, and the lock comprising:

a first locking assembly including a transmission unit and a guide seat connected on an end of the transmission unit, the guide seat having at least one guiding extension which extends from the guide seat, the first locking assembly further including a first body configured to drive the transmission unit, and the first body has at least one locking orifice;

a second locking assembly including a driving element connected with the transmission unit, a connecting position being defined when the first locking assembly and the second locking assembly are connected in a rotatable direction, and the transmission unit and the driving element are rotated axially, the second locking assembly includes at least one third connecting orifice corresponding to the at least one locking orifice;

at least one of the transmission unit and the driving element being rotatably received in and driving the drive orifice of the latch element; the at least one guiding extension being configured to be connected with the latch element and to guide the first locking assembly to be positioned on the connecting position along the rotatable direction opposite to the latch element; and a defining element being passed through the at least one third connecting orifice and into at least one locking orifice, the defining element being configured to connect to the at least one locking orifice when the first locking assembly and the second locking assembly are located in the connecting position and thereby affixes the first and second locking assemblies together.

2. The lock as claimed in claim 1, wherein a respective one of the at least one guiding extension has a contact face formed on an end of the respective one guiding extension and corresponding to a profile of the latch element, and the respective one guiding extension contacts with the latch element by using the contact face so that the transmission unit is located in the connecting position.

3. The lock as claimed in claim 1, wherein the first body has at least one connection portion formed on an end thereof facing the latch element; wherein the guide seat includes an abutting portion corresponding to the first body and having a coupling portion corresponding to the at least one connection portion, hence the guide seat is connected with the at least one connection portion by using the coupling portion so that the guide seat is connected with the first body.

4. The lock as claimed in claim 3, wherein the first body having a first core element, and the abutting portion has an accommodation orifice corresponding to the first core element.

5. The lock as claimed in claim 3, wherein the guide seat has at least one positioning orifice defined on the abutting portion and corresponding to the at least one locking orifice and the at least one third connecting orifice.

6. The lock as claimed in claim 1, wherein the guide seat further includes a leading element, and the second locking assembly includes a fixer, wherein the fixer has a conducting portion corresponding to the leading element so that the conducting portion is connected with the leading element when the first locking assembly and the second locking assembly are located in the connecting position.

7. The lock as claimed in claim 6, wherein when the leading element is a slide rail, the conducting portion is a slider; when the leading element is a slider, the conducting portion is a slide rail.

8. The lock as claimed in claim 6, wherein when the guide seat includes the two guiding extensions, the two guiding extensions are located beside two sides of the leading element.

9. The lock as claimed in claim 6, wherein the second locking assembly further includes a locating lid, and the locating lid has at least one joining portion; the driving element is inserted through the locating lid; the fixer further has at least one securing element corresponding to and connected with the at least one joining portion so that the fixer is connected with the locating lid.

10. The lock as claimed in claim 9, wherein the second locking assembly further includes a knob, an end of which the driving element is mounted, and the driving element is inserted through the locating lid to connect with the transmission unit.

11. The lock as claimed in claim 10, wherein the fixer further has a fitting portion corresponding to the driving element, the fitting portion has at least one mounting projection facing the knob, and the fitting portion has an affix ring received in the at least one mounting projection and connected with the driving element.

12. The lock as claimed in claim 6, wherein the second locking assembly further includes a second body having at least one recessed portion, at least one disposing face formed on an end of the at least one recessed portion, and the fixer has at least one engagement arm configured to abut against the at least one disposing face.

13. The lock as claimed in claim 12, wherein the second body includes three recessed portions formed on two sides of a top of the second body and a bottom of the second body, wherein the at least one engagement arm is columnar.

14. The lock as claimed in claim 13, wherein the second body has a second core element, a distal end of which is connected with the driving element, and the fixer further has a passing aperture defined thereon and fitting with the second core element.

15. The lock as claimed in claim 1, wherein the at least one locking orifice is a threaded orifice and the defining element is a screw connected with the at least one locking orifice by threaded engagement therewith, and wherein the transmission unit is intersected with the driving element, and the transmission unit is perpendicular to and is connected with the driving element on the connecting position.

16. A lock having a rotatable auxiliary positioning structure being adapted to connect with a latch element which includes a drive orifice, and the lock comprising:

a first locking assembly including a transmission unit and a guide seat connected on an end of the transmission unit, the guide seat having at least one guiding extension which extends from the guide seat;

a second locking assembly including a driving element connected with the transmission unit, a connecting position being defined when the first locking assembly and the second locking assembly are connected in a rotatable direction, and the transmission unit and the driving element are rotated axially;

at least one of the transmission unit and the driving element being rotatably received in and driving the drive orifice of the latch element; the at least one guiding extension being configured to be connected with the latch element and to guide the first locking assembly to be positioned along the rotatable direction opposite to the latch element so that the transmission unit is located in the connecting position, wherein the guide seat further includes a leading element, the second locking assembly including a fixer, the fixer having a conducting portion corresponding to the leading element, and the leading element and the conducting portion being connected when locating on the connecting position, and wherein the first locking assembly includes a first body, the first body having at least one locking orifice, and the guide seat having at least one positioning orifice defined on the abutting portion and corresponding to the at least one locking orifice, the second locking assembly including at least one third connecting orifice corresponding to the at least one locking orifice and the at least one positioning orifice; and a defining element being configured to connect with the at least one locking orifice, the defining element being passed through the at least one third connecting orifice, the at least one positioning orifice, and a through hole of the fixer and into engagement with the at least one locking orifice when the first locking assembly and the second locking assembly are located in the connecting position and thereby affixing the first and second locking assemblies together.

17. The lock as claimed in claim 16, wherein the second locking assembly further includes a locating lid, and the locating lid has the at least one third connecting orifice and at least one joining portion; the driving element is inserted through the locating lid; and the fixer further has at least one securing element corresponding to and connected with the at least one joining portion so that the fixer is connected with the locating lid.

18. The lock as claimed in claim 16, wherein the at least one locking orifice is a threaded orifice and the defining element is a screw connected with the at least one locking orifice by threaded engagement therewith.

19. A lock having a rotatable auxiliary positioning structure being adapted to connect with a latch element which includes a drive orifice, and the lock comprising:

a first locking assembly including a transmission unit and a guide seat connected on an end of the transmission unit, the guide seat having at least one guiding extension which extends from the guide seat;

a second locking assembly including a driving element connected with the transmission unit, a connecting position being defined when the first locking assembly and the second locking assembly are connected in a rotatable direction, and the transmission unit and the driving element are rotated axially, wherein at least one of the transmission unit and the driving element being rotatably received in and driving the drive orifice of the latch element; the at least one guiding extension being configured to be connected with the latch element and to guide the first locking assembly to be positioned along the rotatable direction opposite to the latch element so that the transmission unit is located in the connecting position, wherein the guide seat further including a leading element, the second locking assembly including a fixer, the fixer having a conducting portion corresponding to the leading element, and the leading element and the conducting portion being connected when locating on the connecting position, wherein the first locking assembly including a first body, and the second locking assembly including a second body, the second body having at least one recessed portion, at least one disposing face formed on an end of the at least one recessed portion, and the fixer having at least one engagement arm configured to abut against the at least one disposing face, and wherein the first body having at least one locking orifice, and the guide seat having at least one positioning orifice defined on the abutting portion and corresponding to the at least one locking orifice, the second locking assembly including at least one third connecting orifice corresponding to the at least one locking orifice and the at least one positioning orifice; and a defining element being configured to connect with the at least one locking orifice, the defining element being passed through the at least one third connecting orifice, and the at least one positioning orifice and into engagement with the at least one locking orifice when the first locking assembly and the second locking assembly are located in the connecting position and thereby affixing the first and second locking assemblies together.

20. The lock as claimed in claim 19, wherein the at least one locking orifice is a threaded orifice and the defining element is a screw connected with the at least one locking orifice by threaded engagement therewith.

* * * * *